US007908571B2

(12) United States Patent
Bowers et al.

(10) Patent No.: US 7,908,571 B2
(45) Date of Patent: Mar. 15, 2011

(54) SYSTEMS AND MEDIA TO IMPROVE MANUFACTURABILITY OF SEMICONDUCTOR DEVICES

(75) Inventors: Benjamin J. Bowers, Cary, NC (US); Anthony Correale, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/971,171

(22) Filed: Jan. 8, 2008

(65) Prior Publication Data
US 2008/0115093 A1 May 15, 2008

Related U.S. Application Data

(63) Continuation of application No. 11/265,641, filed on Nov. 2, 2005, now Pat. No. 7,343,570.

(51) Int. Cl.
G06F 17/50 (2006.01)
(52) U.S. Cl. ............... 716/2; 716/9; 716/11; 716/12
(58) Field of Classification Search .............. 716/2, 9, 716/11, 12
See application file for complete search history.

(56) References Cited

U.S. PATENT DOCUMENTS

| 5,557,533 | A | 9/1996 | Koford et al. |
| 5,856,927 | A | 1/1999 | Greidinger et al. |
| 6,002,857 | A | 12/1999 | Ramachandran |
| 6,054,872 | A | 4/2000 | Fudanuki et al. |
| 6,093,214 | A | 7/2000 | Dillon |
| 6,170,080 | B1 | 1/2001 | Ginetti et al. |
| 6,425,115 | B1* | 7/2002 | Risler et al. .............. 716/17 |
| 6,493,658 | B1 | 12/2002 | Koford et al. |
| 6,505,335 | B1 | 1/2003 | Tanaka |
| 7,313,769 | B1 | 12/2007 | Lukanc et al. |
| 2002/0013931 | A1 | 1/2002 | Cano et al. |
| 2002/0087942 | A1 | 7/2002 | Kitada |
| 2002/0124233 | A1 | 9/2002 | Andreev et al. |
| 2002/0182844 | A1 | 12/2002 | Igarashi et al. |
| 2003/0208738 | A1 | 11/2003 | Hsu et al. |
| 2003/0229875 | A1 | 12/2003 | Smith et al. |
| 2004/0139412 | A1 | 7/2004 | Ito et al. |
| 2004/0237059 | A1 | 11/2004 | Chen et al. |

FOREIGN PATENT DOCUMENTS

| CN | 1276092 A | 12/2000 |
| CN | 1124690 C | 10/2003 |

* cited by examiner

*Primary Examiner* — Thuan Do
(74) *Attorney, Agent, or Firm* — Henri D. Schnurmann; Schubert Law Group PLLC

(57) ABSTRACT

Methods, systems, and media to improve the manufacturability of cells and structures within cells of an integrated circuit are disclosed. Embodiments comprise a method of arranging programmable cells, routing the programmable cells, analyzing the cell arrangement and interconnect wiring for manufacturing improvement opportunities, and modifying the programmable cell structures to incorporate the manufacturing improvements. In some embodiments, wires are spread to prevent shorting. In other embodiments, the reliability of contacts and vias is improved by adding additional metallization to the areas surrounding the contacts and vias, or by adding redundant contacts and vias. In one embodiment, a series of manufacturing improvements are made to integrated circuit cells in an iterative fashion.

20 Claims, 8 Drawing Sheets

LEGEND FOR FIGS 5A & 5B

| | DIFFUSION MATERIAL |
| | POLYSILICON MATERIAL |
| | METAL MATERIAL |
| | CONTACT |
| x | ROUTING TARGET |

LEGEND FOR FIGS 6A-6C

▨ METAL LAYER 1 MATERIAL
░ METAL LAYER 2 MATERIAL
▥ CONTACT MATERIAL
▩ VIA MATERIAL

LEGEND FOR FIGS 6D & 6E

- ▨ METAL LAYER 1 MATERIAL
- ▧ METAL LAYER 2 MATERIAL
- ▨ CONTACT MATERIAL
- ▨ VIA MATERIAL

SYSTEMS AND MEDIA TO IMPROVE MANUFACTURABILITY OF SEMICONDUCTOR DEVICES

CROSS-REFERENCE TO RELATED APPLICATION

Pursuant to 35 USC §120, this continuation application claims priority to and benefit of U.S. Utility patent application Ser. No. 11/265,641, filed Nov. 2, 2005 now U.S. Pat. No. 7,343,570, on behalf of inventors Benjamin J. Bowers and Anthony Correale Jr., entitled "Methods, Systems, and Media to Improve Manufacturability of Semiconductor Devices."

FIELD

The present invention generally relates to the field of integrated circuits. More particularly, the present invention relates to methods, systems, and media to interconnect cells and structures within cells formed in a substrate of an integrated circuit to improve manufacturability and reliability.

BACKGROUND

Today, integrated circuits contain millions of transistors on a single chip, with many critical circuit features having measurements in the deep sub-micron range. As manufacturers implemented more and more circuit elements in smaller and smaller silicon substrate surface areas, engineers and designers developed hardware and software tools to automate much of the integrated circuit design and manufacturing process. While these software and hardware tools have drastically reduced the time from conception to production, these same tools currently have manufacturing limitations. One such limitation is reliability of the integrated circuits, both during manufacturing and testing-stages, and in the final product chips. As they are currently being used, these tools also interfere with increasing circuit component densities.

While there are several approaches to developing integrated circuits, a primary method today uses standard cells in the development process. This standard cell method, also referred to as cell-based topology has the advantage of achieving greater circuit densities than other methods, such as a gate array method. Like the gate array method, standard cell designs rely on a set of predefined circuit elements, called cells, to implement the circuit design. The complexity of standard cells can range from simple logic gates, such as those found in gate arrays, to block-level components such as RAMs, ROMs, and PLAs. In other words, the cell-based topology may comprise low-level cells, such: as n-fet and p-fet transistors, or it may comprise complex function blocks, designed either from scratch or by combining lower-level cells.

Designers and engineers commonly design and fabricate semiconductor integrated circuits by first preparing a schematic diagram or hardware description language (HDL) specification of a logical circuit. The HDL specification provides the details for how the circuit elements are interconnected. With standard cell technology, the schematic diagram or HDL specification is synthesized into standard cells of a specific cell library. Each standard cell corresponds to a logical function that is implemented using transistors.

Using the HDL specification and standard cells from a cell library, the particular interconnections of the circuit elements of an integrated circuit design are typically expressed as a list of network elements, a.k.a. a net list. A series of computer-aided design tools generate this net list of standard cells and the interconnections between the cells. A floor planner or placement tool uses the net list to place the standard cells at specific locations in an integrated circuit layout pattern. After generating this layout pattern, software tools, called routers, determine the physical locations of conducting paths between the cells. A number of algorithms have been developed and implemented to facilitate the automatic routing of interconnections among the circuit elements of cell-based circuit designs. These algorithms comprise the heart of the router software tools. Along with other parameters, these router algorithms use the net list parameters and attempt to automatically route the interconnections among the circuit elements of the standard cells, including the function block cells.

Most routing tools used for cell-based designs begin with the placement of circuit elements, such as standard cells and function blocks. The placement of circuit elements can be automatic, as in the case of a floor planner mentioned above, or placement can be manual. Placement of circuit elements is driven by a number of parameters, such as orientation requirements, cell placement needs relative to other dependent cells, circuit compaction requirements, and the number of interconnect lines between cells.

After placement, a typical next step for routing is commonly referred to as global routing. The global router attempts to logically determine general paths, or channels, for groups of interconnections. The global router considers many factors in determining the channels, such as available avenues for the interconnections and lengths of the interconnections. Once the global router has assigned the general flow of interconnect lines, designers use a detailed router, such as a channel router, to make the actual interconnect lines fit the assignments made by the global router. In other words, once the global assignments have been made, it becomes the job of the channel router to figure out how to route all of the lines through each channel as assigned by the global router. In simplistic terms, the channel router chooses a target from one cell and determines a particular physical path to a target on a second cell. The router repeats this process for all the defined interconnections.

To facilitate efficient routing, standard cells often have numerous cell targets for the router. Having numerous targets on the standard cells allows the router more flexibility in choosing an interconnect line destination. Put another way, the router may choose from a variety of targets to shorten interconnect lines, conform to standard cell requirements, or comply with channel restrictions. In routing the actual interconnect lines, the channel router may need to relocate the previously placed cells to implement the design. By way of example, the number of interconnect lines that must run in a certain channel may physically exceed the allotted channel width, requiring that cells be moved to increase the channel width and accommodate the interconnect lines.

Once the standard cells have been placed and routed, the net list, the cell layout definitions, the placement data, and the routing data together form an integrated circuit layout definition that is used to fabricate the integrated circuit. The integrated circuit is fabricated by depositing multiple layers on a substrate known as a wafer. The lowest "base" layers include the active areas of the transistors, including the diffusion regions, the gate oxide areas, and the desired patterns of the polycrystalline silicon gate electrodes, often referred to as polysilicon gate electrodes.

The integrated circuit layers are fabricated through a sequence of pattern definition steps that are mixed with other process steps such as oxidation, etching, doping, and material deposition. One or more metal layers are then deposited on top of the base layers to form conductive segments that interconnect the standard cells. Formation of the metallization layers over the substrate facilitates interconnection of the transistors to form more complex devices such as NAND gates, inverters, and the like. Current integrated circuits typically have six to ten metallization layers.

The metallization layers utilize lines, contacts, and vias to interconnect the transistors in each of the cells as well as to interconnects the cells to form the integrated circuit such as a processor, state machine, or memory. Lines typically reside in parallel paths within each layer. Lines in vertically adjacent layers often run perpendicular to, one another, separated by a non-conductive passivation layer also referred to as an inter-level dielectric layer such as, e.g., silicon oxide. The silicon oxide is etched to form the vias, which interconnect the lines of various metallization layers in accordance with the circuit design. Inputs and outputs of the integrated circuit are brought to a surface with contacts and vias to bond the circuits with pins of a chip package. The chip package typically includes an epoxy or ceramic that encloses the integrated circuit to protect the circuit from damage and pins to facilitate a connection between the inputs and outputs of the integrated circuit and, e.g., a printed circuit board.

Using the aforementioned manufacturing process, integrated circuits have been scaled down to increase both functionality and speed available in chip packages. Designers have continually scaled down cell structures to smaller and smaller dimensions, increasing the density of cells per unit area of the substrate. Unfortunately, as cell structures and interconnect lines have shrunk, this miniaturization has brought certain manufacturing challenges.

Engineers and designers have encountered numerous manufacturing problems during the integrated circuit miniaturization process. As an example of one, manufacturing problem, the interconnect lines, or wires, are sometimes placed so close that they tend to short together when created. Aside from the manufacturing problems associated with shorting wires, improperly etched via holes sometimes prevent the via from fully contacting the top and bottom metal layers. Additionally, corner rounding of polysilicon or active diffusion during the manufacturing process alters the effective dimensions of cell components, such as transistors. Because of problems such as these, design for manufacturability (DFM) techniques, such as those techniques that solve the problems of shorted wires or improperly etched via holes, have become increasingly important.

Unfortunately, DFM techniques at the cell level are not sufficient, as they only improve features internal to the cell. Improving cell external features, namely those features that may interact with other cells or the top level interconnect, must occur once the cell has been placed, or is in-situ. Because of the great number of ways the cells may be situated, it is infeasible to design an exhaustive set of layouts for each cell situation.

Instead of using DFM techniques at the cell level, designers alternatively turn to software approaches. Using software, some designers alter the top level and add additional shapes to it. However, using software to add shapes in this manner has many disadvantages. First, adding shapes to the top level significantly increases the complexity of the design. Second, designers have little control over the design, other than changing such things as the Boolean operations. Lastly, using software in this manner generally only adds shapes and complicates the design, instead of taking them away and simplifying it.

Hierarchical methods that reduce the complexity of the top level, such as reducing the number of routing target connections, have been proposed. However, such methods have limited effectiveness in reducing cell and top level complexity, due to the different situations in which a cell may be placed. For example, consider a cell that may have three DFM improvements made. Suppose further that the cell may be used in two different situations, or instances. The only DFM improvements that may be made are those that are common to both cell situations. Often, this will only allow one DFM improvement, of the three potential improvements, to be made to both cell instances.

What is needed is a new method for increasing the manufacturing reliability, or new DFM techniques, of integrated circuits at the base cell level. New DFM techniques, such as those for preventing the shorting of wires and improving vias and contacts, are needed. Additionally, these new DFM techniques should facilitate further miniaturization of integrated circuits.

SUMMARY

The problems identified above are in large part addressed by methods, systems, and media to improve manufacturability of semiconductor devices. One embodiment comprises a method to improve the manufacturability of an integrated circuit using modified cells. The method generally involves arranging unmodified cells, defining routes of conductive paths between the cells, evaluating arrangement of cells for manufacturing improvement opportunities, and modifying the cells to incorporate the manufacturing improvement changes on individual cell instances.

Another embodiment comprises a system for improving manufacturability of integrated circuits on semiconductor substrates by modifying the cells. The system may comprise an arrangement module for placing and arranging a set of unmodified cells and a router for specifying wire routes between the cells. The system may comprise an evaluation module, which examines the cell arrangement for manufacturing improvement opportunities. The system may further comprise a modification module that modifies the cells to incorporate the manufacturing improvement changes. The system may also include modules for evaluating such characteristics as the timing performance of the integrated circuit.

A further embodiment comprises a machine-accessible medium containing instructions for a machine to improve manufacturability of integrated circuit designs. The machine-accessible medium may comprise instructions for arranging a number of integrated circuit cells, defining a routes of interconnecting conductive paths between the cells, evaluating the integrated circuit cell arrangement for manufacturability improvements, and modifying the cells to incorporate the manufacturing changes.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Figure 1:
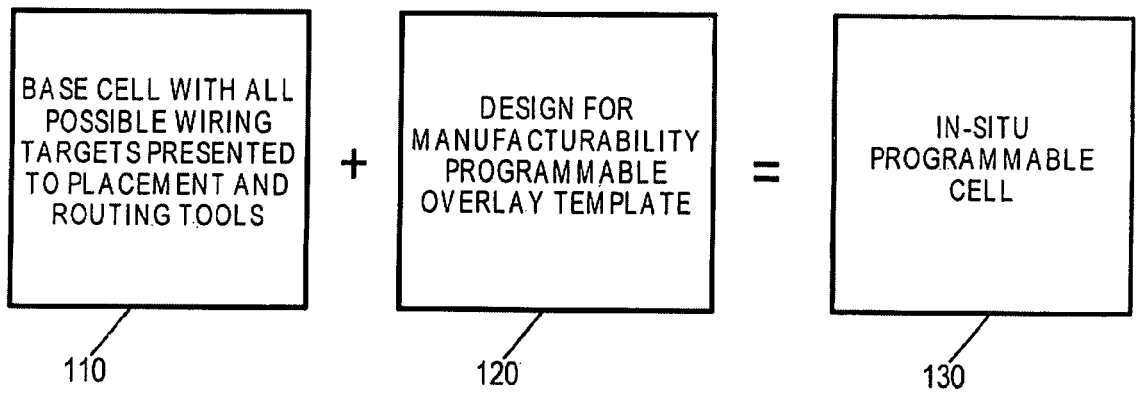
FIG. 1 depicts the concept of combining a base cell, including wire routing targets, with a programmable overlay template to form a programmable cell.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media for new DFM techniques that improve manufacturability of semiconductor devices are disclosed. New DFM techniques for enhancing the manufacturability and reliability of cells and structures within cells formed in a semiconductor substrate of an integrated circuit are discussed. Embodiments comprise a base cell, with alternate wiring targets available to placement and routing tools, and a programmable DFM overlay template that combine to form a in-situ programmable cell. In some embodiments, software or a designer removes unused redundant input and output connections to reduce capacitance and critical area. In other embodiments, software or hardware moves wires internal to the cell in order to separate them and reduce the likelihood of metal bridging. In further embodiments, additional metal is added for increased coverage of contacts.

In alternative embodiments, original base cells are placed with all routing targets enabled on an overlay cell. An analyze step is performed and the overlay cell is partially modified, removing an unused input or output. Upon the partial modification of the overlay cell, one of two different algorithms may be executed. In one instance, a redundant via algorithm may then be run to analyze for opportunities to increase contact metal coverage. In this instance, when the redundant via algorithm is run after the partial modification of the overlay cell, a second algorithm, such as an algorithm to analyze for opportunities to implement redundant vias, may be run. In an alternative instance, the redundant via algorithm may be executed before the algorithm for increasing metal coverage.

While portions of the following detailed discussion describe many embodiments comprising new DFM techniques for improving the reliability of integrated circuits, upon review of the teachings herein, a person of ordinary skill in the art will recognize that the following invention may be practiced in a variety of ways, such as by a designer, by using software algorithms, and in some embodiments using integrated circuit design hardware. All methods of practicing the invention are interchangeable. Further, embodiments discuss polycrystalline silicon gate structures, silicon substrates, metal lines, and the like, but one of ordinary skill in the art will recognize that other materials may substituted for these structures when employed in accordance with similar constraints to perform substantially equivalent functions.

Turning to the drawings, FIG. 1 illustrates the concept of creating an in-place or in-situ programmable cell. Since many integrated circuits today are designed using computer-aided-design (CAD) and computer-aided-manufacturing (CAM) tools, the improved DFM techniques disclosed herein may be integrated in the design process. A designer may build a library of programmable cells that may then be used to build integrated circuit designs. By way of example, one may start with a single standard cell. The cell may be simple, comprising only a field-effect transistor, or the cell may comprise numerous transistors that form a complex function block.

The standard cell may have multiple components, all of which may not be necessary in the final design. For example, the standard cell may comprise a base cell with numerous upper-layer wiring targets (element 110). These multiple, wiring targets may provide placement and router tools a variety of alternative landing points for connections with other cells. To this standard cell, a designer may add a DFM programmable overlay template 120. The combination of the standard cell (element 110) and the DFM programmable overlay template 120 comprises an in-place or in-situ programmable cell 130. The in-situ programmable cell 130 may then be used during the integrated circuit design process. Once placed in the design and routed, the in-situ programmable cell 130 may then be modified, removing any unnecessary components and thereby allowing other DFM enhancements.

Figure 2:
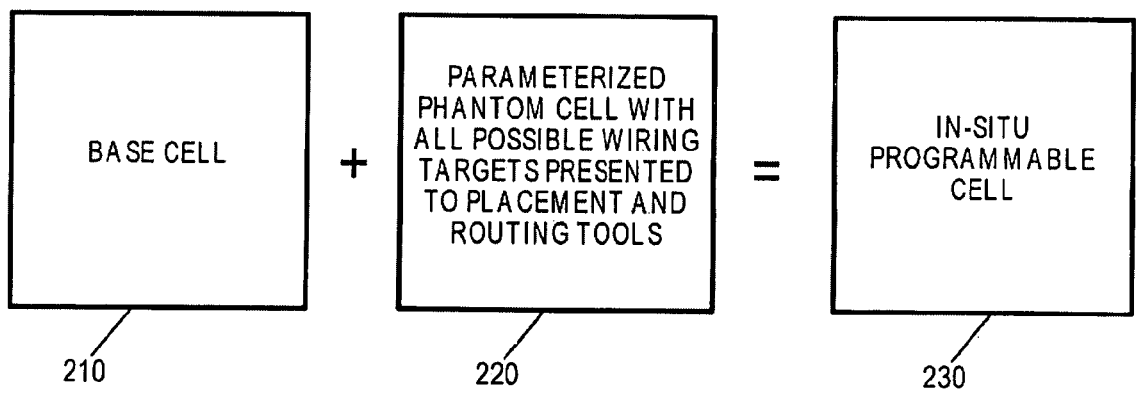
FIG. 2 depicts an alternative concept of combining a base cell with a parameterized phantom cell to create an in-situ programmable cell.

For the sake of clarity, an additional illustration may help one understand the concept of an in-situ programmable cell. In FIG. 2, an alternative in-situ programmable cell 230 may be thought of actually comprising two or more distinct cells. One part of the cell, which one may refer to as a base cell 210, may contain structures that are internal to the cell which do not interconnect with other cells. The remaining structures, which are used to interconnect with other cells, may be placed in a second cell. This second cell, which may be termed a phantom cell 220, may then be converted into a parameterized layout cell. In other words, the phantom cell 220 may have a number of programmable parameters assigned to each of the structures in the cell. Multiple DFM modifications may be performed on the phantom cell 220 for each unique cell placement, or arrangement.

Once multiple in-situ programmable cells have been placed in an integrated circuit design file, a program may then analyze each arrangement for each in-situ programmable cell. Based on the particular arrangement, the program may enable or disable one or more of the phantom cell parameters. For example, one in-situ programmable cell arrangement may have five discrete structures, only three of which are needed to interconnect the cell to other adjacent cells. The program may enable the parameters for the three necessary structures and disable the parameters for the two unnecessary structures. As for the unnecessary structures, the program may remove them from the design file altogether, resulting in a smaller design file with the design having improved critical area and other DFM attributes.

Designers may use the base cell 210 and phantom cell 220 combination in a variety of ways to create the in-situ programmable cell 230. For example, designers may create the base cell 210 inside the phantom cell 220, with the phantom cell 220 being placed in the design. Alternatively, designers may place the base cell 210 and the phantom cell 220 within the same level in the integrated circuit. Obviously, the new DFM techniques disclosed by using the in-situ programmable cell 230 in this embodiment may be practiced in a variety of ways.

Figure 3:
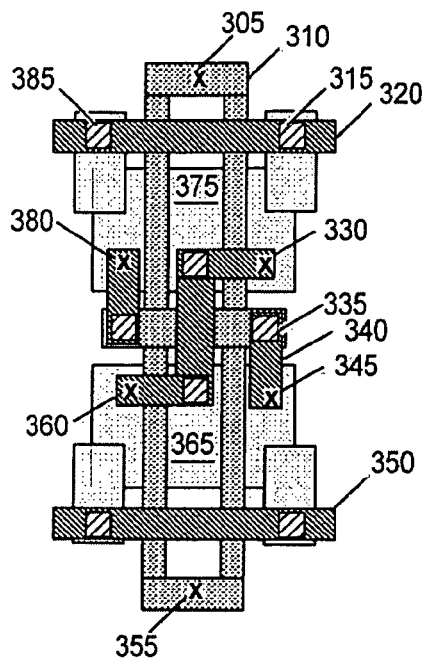
FIG. 3 depicts an embodiment of a programmable cell with numerous wiring targets and excessive cell components to aid the routing process.

To further illustrate the concept of using an in-situ programmable cell for new DFM techniques, we turn now to FIG. 3. FIG. 3 shows a cell 300, comprising a pair of transistors. More specifically, in this embodiment, cell 300 comprises one pair of parallel connected P-channel field effect transistors (p-fet) and one pair of parallel connected N-channel field effect transistors (n-fet). In alternative embodiments, cell 300 may comprise a number of transistors, including multiple n-fet and p-fet pairs. In further embodiments, cell 300 may be a function block, such as a NAND gate or a network of logic gates, comprised of multiple lower level devices, such as field effect transistors.

Cell 300 employs four basic materials: diffusion material, polysilicon, contact material, and metal. At a lower level, cell 300 has a diffusion material 375 connected to a metal rail 320, which resides at an upper level, by way of a contact 315 and a contact 385. The metal rail 320 may carry an active potential, such as VDD, to cell 300. Conversely, cell 300 may also contain another metal rail 350, carrying an active potential, such as ground. The contact 315 and contact 385 comprise conductive contact materials sandwiched between the diffusion material 375 below and the metal rail 320 above. Similar to the contact 315 and contact 385, a contact 335 resides between a polysilicon material 310 and a metal strip 340. In addition to the contact 315, contact 385, and contact 335, cell 300 employs numerous other contacts, providing conductive paths between upper level and lower level materials.

Cell 300 has numerous routing targets. Once cell 300 is placed: in an integrated circuit design, a software routing tool may choose either routing target 305, routing target 355, routing target 345, or routing target 380 when interconnecting the polysilicon material 310 with external cells. Additionally, the software routing tool may choose between routing target 330 and routing target 360 when interconnecting external cells to the cell 300 diffusion material 365 and the diffusion material 375. After placement and routing are both complete, one or more targets (elements 305, 355, 345, 380, 330, and 360) may remain unconnected. Such unconnected target elements may be removed from the final design and cell 300 altered for DFM improvements. Following is a more detailed discussion on how various new DFM techniques may be implemented.

Figure 4:
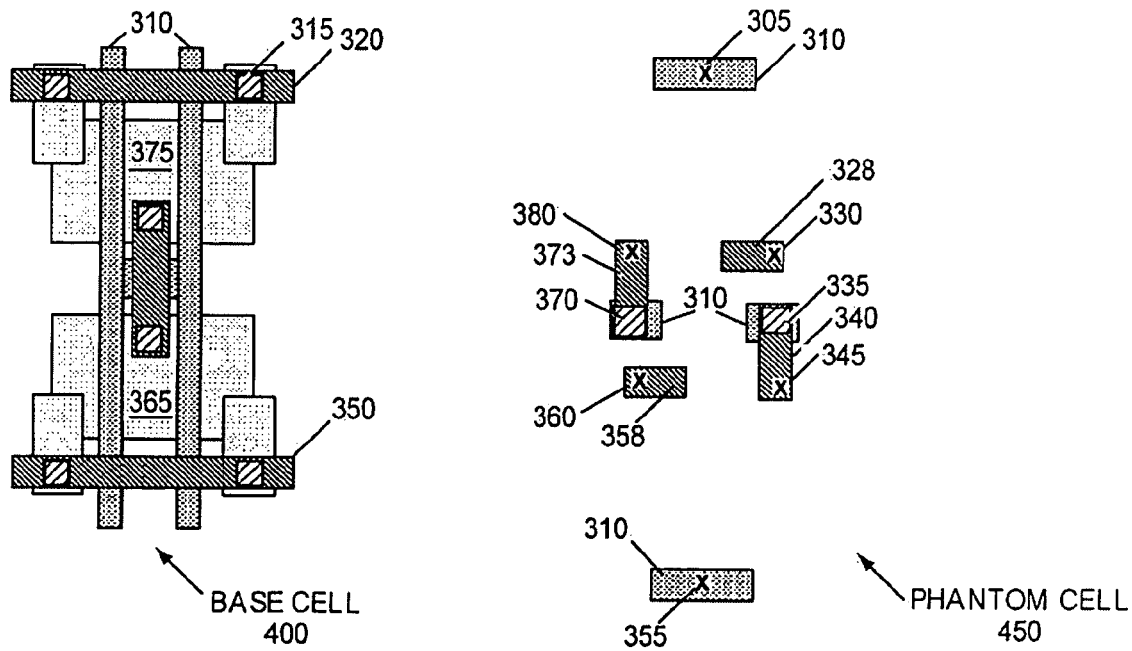
FIG. 4 illustrates how a programmable cell may be divided into two distinct cells, a base cell containing elements not requiring changes, and a phantom cell containing numerous cell structures that may be removed or rearranged.

Similar to the concept discussed for FIG. 1 and FIG. 2, cell 300 shown in FIG. 3 may be considered the combination of two cells, depicted in FIG. 4. One cell, a base cell 400, may comprise elements that are not directly connected to other integrated circuit cells external to cell 300. In one embodiment, base cell 400 may comprise diffusion materials 375, and 365, as well as metal structures, such as metal rail 320, and contacts, such as contact 315. As shown in FIG. 4, base cell 400 may also comprise polysilicon materials, such as polysilicon 310. In alternative embodiments, base cell 400 may comprise only the diffusion materials, such as diffusion materials 365, and 375. Consequently, the remaining elements that may subsequently be altered after a routing step may be placed in a phantom cell 450. In one embodiment, the phantom cell 450 may comprise polysilicon, metal, and contact materials not placed in the base cell 400. As depicted in FIG. 4, the phantom cell 450 may contain an upper and lower section of polysilicon 310, with routing targets 305 and 355, respectively. The phantom cell 450 may also contain alternative metal routing targets 380 and 345, connecting metal strip 340 and metal strip 373 to sections of polysilicon 310 by way of contact 335 and contact 370, respectively. Additionally, the phantom cell 450 may also contain alternate metal routing targets 330 and 360, with associated metal strips 328 and 358, respectively. When combined together, such as placing the phantom cell 450 directly over base cell 400, the resulting cell may have the appearance of a single cell such as the cell 300 shown in FIG. 3.

In further embodiments, base cell 400 may contain different combinations of elements, such as just diffusion elements, or various combinations of diffusion elements, polysilicon, metal, contacts, and vias. Some embodiments may contain one or more of the polysilicon, metal, or contact material elements. Likewise, the phantom cell 450 may contain fewer polysilicon, metal, and contact materials. A factor for determining which elements are placed in the phantom cell 450, versus included in base cell 400, may be whether the elements are likely to be modified after placement and routing. In even further embodiments, all elements may be placed in the phantom cell 450. The elements placed in the phantom cell 450: may all have parameters, such as enable, disable, width, or length, assigned to them. The final parameters for the phantom cell 450 elements may be chosen after some step during the manufacturing process, such as after placement and routing.

Figure 5A:
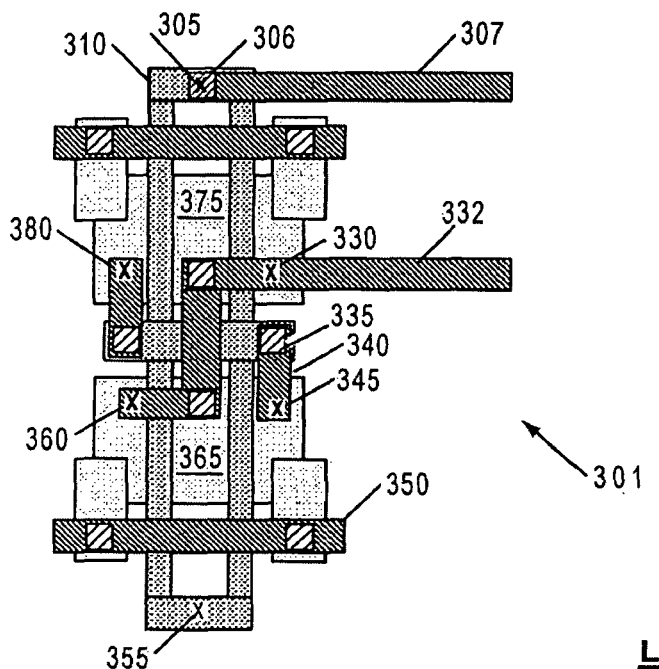
FIGS. 5A-5B illustrate how a router may select certain targets on a programmable cell, and how the cell may be subsequently altered to incorporate manufacturability improvements.

Continuing now with our example of how a cell may be modified for DFM improvements after placement and routing, we focus our attention to FIG. 5A. FIG. 5A shows cell 301, which is the same as the cell 300 shown in FIG. 3 except for the additional metal element 307, with associated contact 306, and metal element 332. Such metal elements and contact may be the result of chosen routing interconnections identified by router software after performing steps of global and detailed routing. Note that while the routing software added the metal element 307 routed to the polysilicon material 310 routing target 305 through contact 306 and metal element 332 routed to routing target 330, there are many routing targets and associated structures left unused. For example, FIG. 5A shows routing targets 345, 360, 380, and 355 left unused. By referring again to the phantom cell 450 shown in FIG. 4, one may see that the structures associated with these unused routing targets are also unused, namely metal strips 340, 358, 373, contacts 335 and 370, the lower section of polysilicon 310, and the middle sections polysilicon 310 associated with contacts 335 and 370, respectively.

Figure 5B:
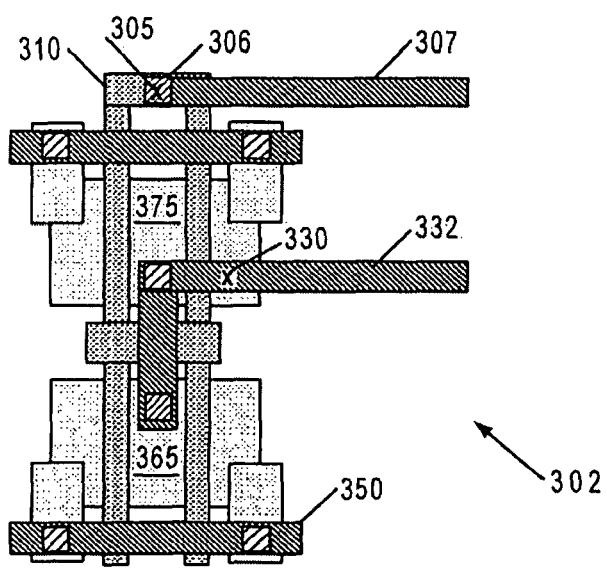

Routing targets and their associated materials not chosen during routing may be removed and the remaining cell elements altered, making way for DFM improvements. In FIG. 5B we see one embodiment wherein metal, polysilicon, and contact materials for unused routing targets have been removed. A new cell 302 still contains upper polysilicon material 310, but the lower section of polysilicon material 310, which used to provide routing target 355, has been eliminated. Similarly, metal element 332 has been routed to routing target 330, in the middle of new cell 302, while the unused metal and contacts associated with routing targets 345, 360, and 380 have also been removed. Additionally, the middle area of polysilicon material 310 has been reduced.

Removing unused polysilicon, metal, and contact materials in this manner reduces both critical area and system capacitance, both of which are significant DFM improvements. Reducing critical area within cells in this fashion allows greater yields on a semiconductor substrate. Reducing system capacitance in this fashion reduces power consumption of the integrated circuit, another manufacturability improvement. Additionally, when the unused elements are removed critical geometry may be improved, making way for more DFM improvements within the cells themselves.

FIGS. 6A through 6E illustrate that multiple new DFM techniques may be implemented after cells have been placed and routed, including some techniques which are mutually exclusive. In cases where there are several potential mutually exclusive DFM techniques that may be employed, various trade-offs may be evaluated to select from the mutually exclusive options. In other words, designers may need to choose one DFM technique over another, as both techniques may be physically difficult or impossible to employ at the same time. This concept of making trade-offs will become clearer after the following discussion.

Figure 6A:
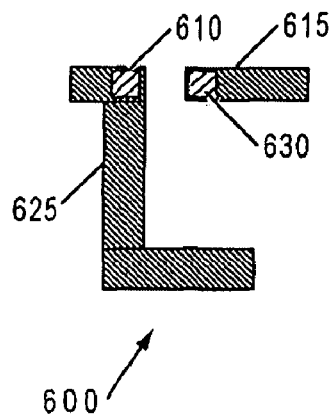
FIGS. 6A-6E illustrate how some manufacturability changes may be mutually exclusive.

FIG. 6A shows one phantom cell 600. Although not shown for reasons of clarity, assume that phantom cell 600 resides atop a base cell and that both cells have been placed in an integrated circuit design. Assume further that, other integrated circuit cells, similar to the phantom cell 600 and the associated base, cell, have also been similarly placed in areas surrounding the phantom cell 600 and that the design is now in the detailed routing stage. For purposes of routing, further assume that the phantom cell 600 has all routing targets enabled, namely contacts 610 and 630. In other words, a routing software algorithm may either select contact 610 as the designated cell input, or select contact 630. Contacts 610 and 630 provide conductive paths to metal layer 1 segments 625 and 615, respectively.

Figure 6B:
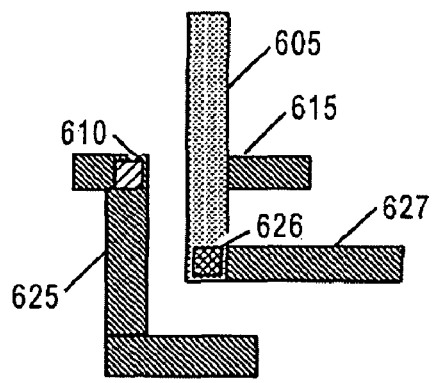
Figure 6C:
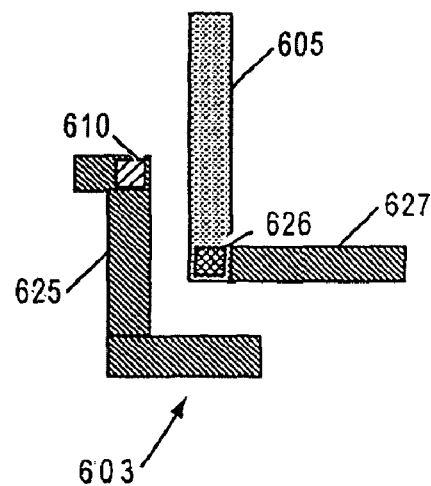

In examining FIG. 6B, assume, that the routing software algorithm chooses contact 610 and that the algorithm also selects the area surrounding unused metal segment 615 for a fly-over route involving a metal layer 2 segment 605, a via 626, and a metal layer 1 segment 627. Since contact 630 was an alternate contact to contact 610, and since contact 610 was chosen during routing, contact 630 and its associated support structure, namely metal layer 1 segment 615, are no longer needed. Instead, metal layer 1 segment 625 and contact 610 provide the input to the phantom cell 600 and the underlying base cell in the final integrated circuit design. Consequently, DFM algorithms may remove metal layer 1 segment 615 and contact 630 to make room for DFM improvements as depicted in FIG. 6C. In this particular embodiment, removing these two structures from the design reduces metal layer 1 critical area and provides a partially modified phantom cell 603.

Figure 6D:
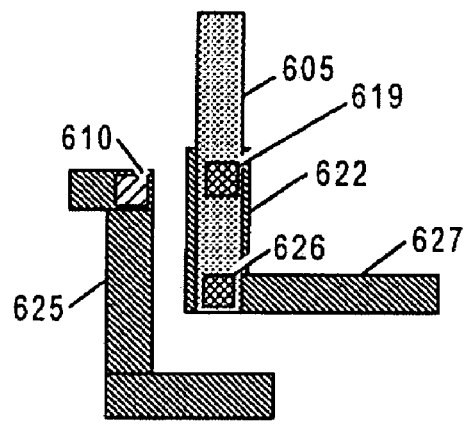
Figure 6E:
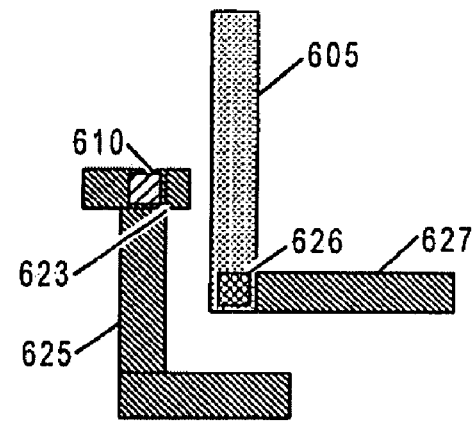

As noted above, computer algorithms may make subsequent DFM improvements after cells have been placed and routed, including some improvements that are mutually exclusive. In such cases, designers may need to choose one DFM improvement over another because both improvements may be physically difficult or impossible to implement at the same time. FIGS. 6D and 6E provide an illustration of this problem. FIG. 6D illustrates one DFM improvement that may be made to the metal layer 2 segment 605, the metal layer 1 segment 627, and associated via 626 added by the routing software. If desired, a DFM improvement algorithm may add a supporting metal layer 1 segment 622 and a second via 619 to improve via reliability between the metal layer 1 segment 627 and the metal layer 2 segment 605. Worth noting, this enhancement of adding a redundant via and associated metal layer 1 segment is possible due to eliminating metal layer 1 segment 615 and contact 630 during the prior personalization step.

As an alternative DFM improvement that may be implemented to improve contact reliability, in lieu of improving via reliability, may be that of increasing metal layer 1 coverage area. FIG. 6E illustrates this alternate DFM improvement. To improve the contact reliability of contact 610, a DFM improvement algorithm may increase metal layer 1 coverage material surrounding contact 610. More specifically, the DFM algorithm may add a metal layer 1 segment 623 immediately adjacent to metal layer 1 segment 625 and contact 610. One skilled in the art of integrated circuit, manufacturing will realize that increasing the metal surface area surrounding a contact in this manner will significantly improve contact reliability. Using this technique may allow improperly etched contact and via holes to still adequately contact the top and bottom metal layers.

FIGS. 6D and 6E demonstrated one example wherein increasing via reliability before increasing contact reliability precluded the possibility of implementing both improvements when both changes were in close proximity with each other. To state this differently for the sake of clarity, adding the supporting metal layer 1 segment 622 and the second via 619 to improve via reliability between the metal layer 1 segment 627 and the metal layer 2 segment 605 prohibited adding the metal layer 1 segment 623 adjacent to metal layer 1 segment 625 because of the limited distance between the supporting, metal layer 1 segment 622 and the metal layer 1 segment 623. Making both changes may lead to manufacturing problems, such as metal bridging between the two metal structures.

More generally, one should note that the order of implementing different DFM improvements, which are mutually exclusive, limits the availability of subsequent DFM modifications. Accordingly, the order of executing different DFM improvement algorithms may affect the final integrated circuit design. In some embodiments, such different DFM improvement algorithms may be entirely separate programs. In alternative embodiments, the algorithms may be included in the same program, but a designer or program parameter may determine which improvements may be made. In further embodiments, a machine may automate the process of selecting which DFM improvements will be made, potentially without the aid of software. All such embodiment variations are anticipated and come within the scope of this invention.

Figure 7A:
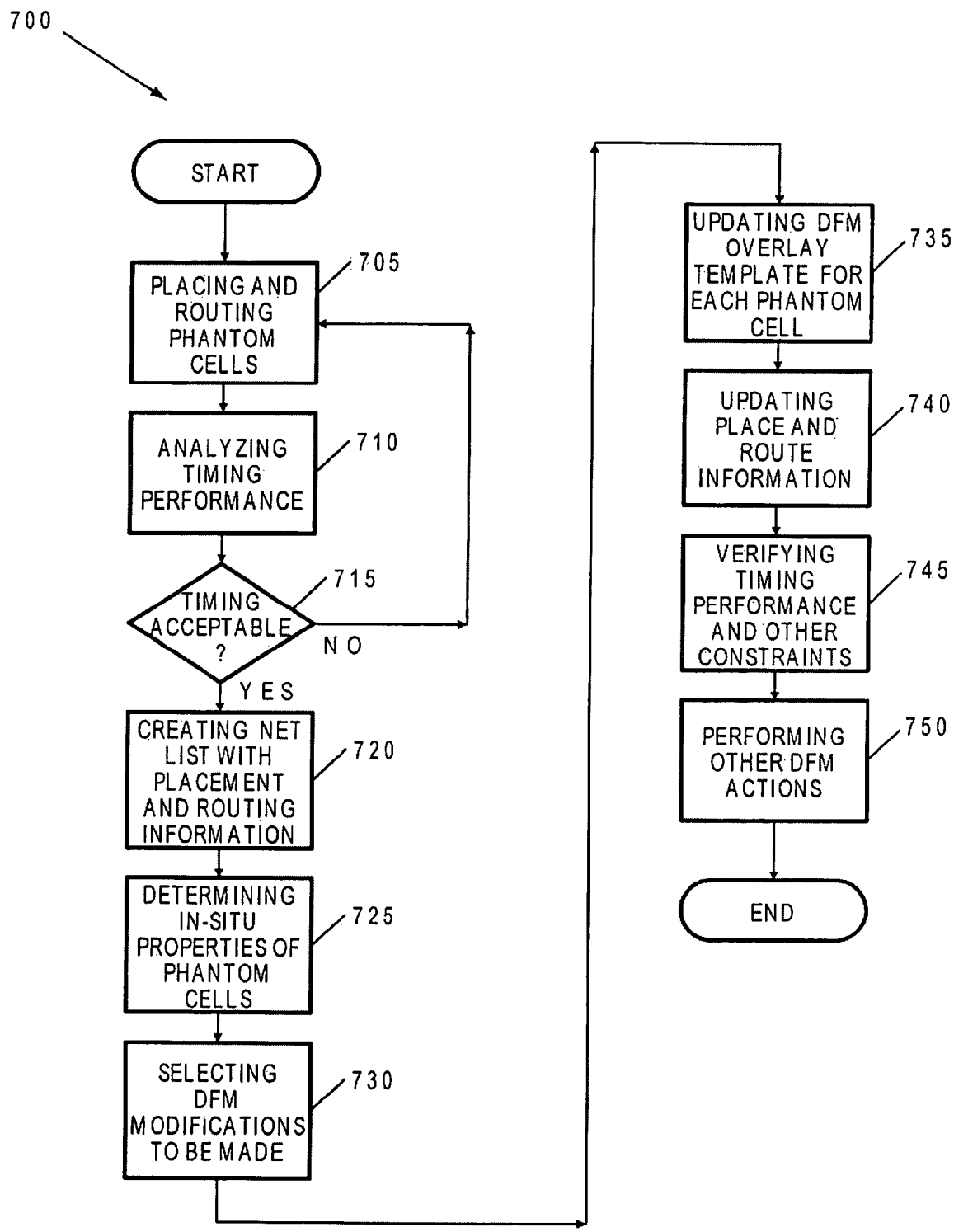
FIGS. 7A-7C depict flowcharts of embodiments to incorporate one or more design for manufacturability changes into an integrated circuit design.

FIG. 7A depicts a flowchart 700 of an embodiment to form an integrated circuit with improved DFM enhancements. Flowchart 700 begins with designing an integrated circuit by first arranging one or more phantom cells and determining locations of the routing interconnections (element 705). Such arrangement and routing may be physical, as in the case with CAD/CAM tools, or they may be abstract, as in the case of a detailed textual circuit description or a preliminary net list.

While not explicitly stated, inherent in the embodiment described by FIG. 7A is a preliminary step of first developing a library of phantom cells. That is to say, assembling a collection of integrated circuit cells with configurable parameters, which will serve as the building blocks of creating integrated circuit designs, must be completed before designing the integrated circuit. In some embodiments, developing such a library of phantom cells, or configurable cells, may involve little more than modifying existing cell libraries and configuring parameters for elements that may be removed and/or modified after routing.

After placing and routing the phantom cells, the timing performance of the circuit may be analyzed (element 710). Analyzing the timing performance of the integrated circuit design may occur early in the design, similar to the embodiment of FIG. 7A, or it may occur later in the design, such as immediately before fabrication. Designers may prefer to analyze the timing early in the design process, though, to minimize additional work that may be required in later design stages.

Once the timing analysis is complete a designer, or software performing the work of a designer, may choose to modify the placement and interconnection routes (elements 715 and 705). Modifying the placement and interconnection routes may be necessary to correct logical errors or propagation delays in the initial circuit design. Assuming the timing is acceptable, though, a designer may choose to compile a net list including the placement and routing information of the arrangement of phantom cells and interconnection routes (element 720).

The net list (created during element 720) may then be used in analyzing the phantom cell interconnections of the integrated circuit design for DFM improvement opportunities (element 725). For example, a DFM algorithm may sort through the net list for instances where external interconnects are not placed in order to add metal coverage around contacts. Alternatively, a DFM algorithm may analyze the data for instances where dummy layer fill, or waffles, may be placed in sensitive locations which might otherwise be subject to manufacturability problems. Such improvement opportunities, may be numerous and exhaustive. Dummy fill and additional metal coverage for contacts are merely two examples.

After scrutinizing the phantom cell layout and interconnections for DFM improvement opportunities, a designer may select precisely which DFM modifications will be implemented (element 730). For each instance where a DFM modification has been identified, a DFM algorithm may then select the affected phantom cell and alter the appropriate cell parameters (element 735). For example, a cell containing an n-fet and p-fet pair of transistors with unused routing target elements may have the parameters for the unused elements set to zero, or disabled, such that the elements will not appear in the integrated circuit design. This process of modifying individual phantom cells may continue until all identified DFM modifications have been implemented.

Depending on which type of modifications were made to the phantom cells during the process of updating the phantom cells (element 735), a designer or software program may alter the place and route information (element 740) with updated parameters from the DFM modifications. Such update may be necessary, for example, when metal layer elements have been removed which restricted the width or length of an interconnect line. With the culprit metal layer elements removed, the interconnects may be rerouted with greater widths and shorter lengths.

Once the place and route information has been updated (element 740), a designer may again verify the integrated circuit timing performance, as well as evaluate the circuit for other circuit constraints (element 745). Verifying the timing performance may be necessary, for instance, when any logical circuit elements have been altered or if any the DFM modifications were of a nature that may affect circuit timing. Examples of other circuit constraints may be critical geometry or maximum interconnection lengths.

After verifying timing performance and satisfying any other design constraints (element 745), a DFM software algorithm may further implement other DFM improvements (element 750). The DFM software algorithm may choose to supplement a metallization layer with dummy fill in sensitive locations or increase the width of metal interconnect wires that will be carrying high current loads.

A concept alluded to above is the concept of incorporating multiple DFM improvements onto a single integrated circuit design. One may incorporate multiple DFM changes in a single step in the design process, or one may alternatively implement them in a more methodical, deliberate, and iterative manner. Regardless of the manner in which the DFM improvements are implemented in the design, whether by single pass or iteratively, the DFM improvements may occur at different times in the design process. To illustrate just some of the ways in which the DFM improvements may be implemented in the design process, we turn now to FIGS. 7B and 7C.

Figure 7B:
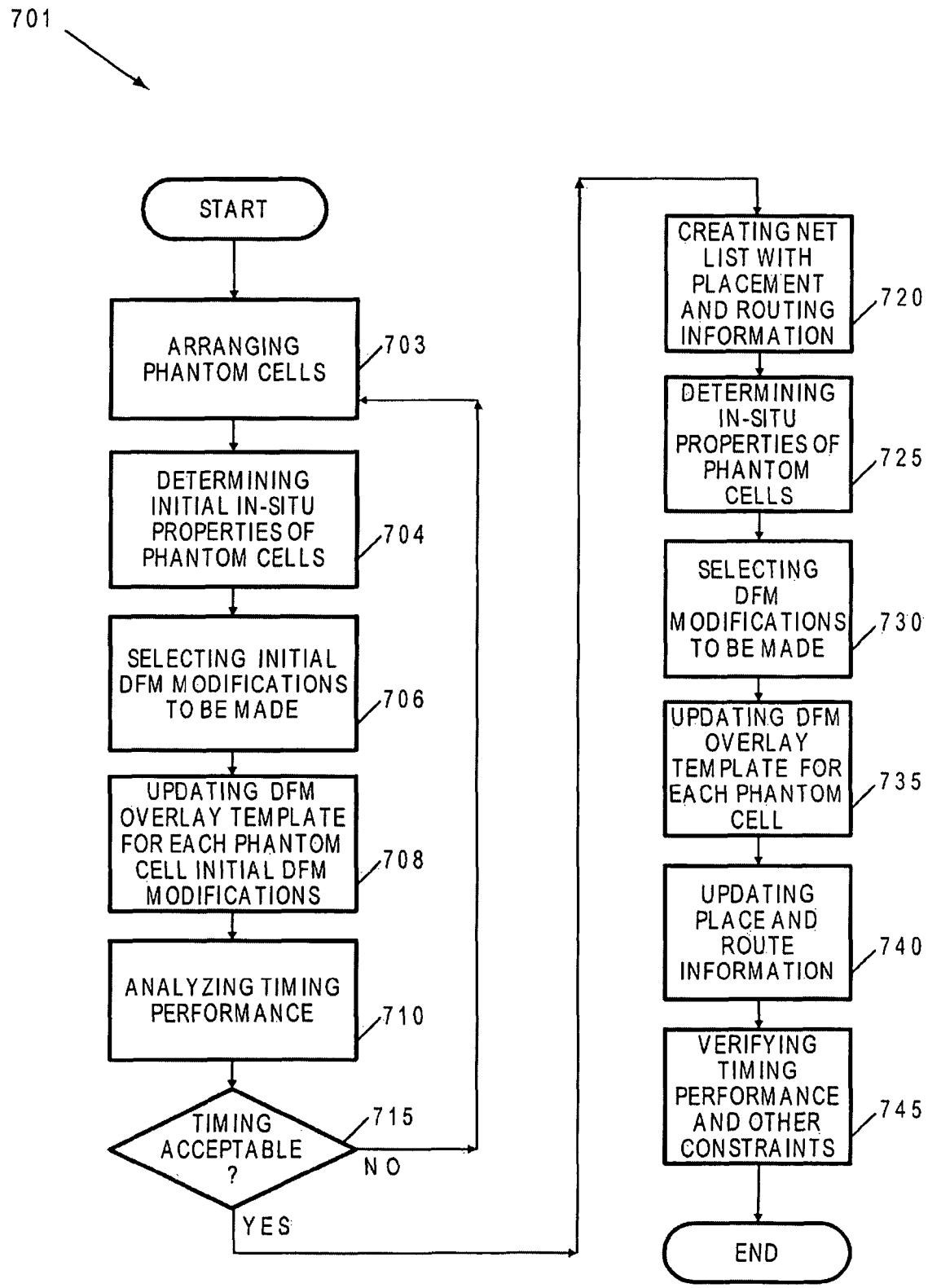

FIG. 7B depicts a flowchart 701 of an alternative embodiment to foil an integrated circuit with improved DFM characteristics by using programmable cells, or phantom cells. Similar to flowchart 700, the embodiment in flowchart 701 illustrates that the method of using phantom cells to implement DFM enhancements in integrated circuits may occur after final top level routing (elements 720 through 745).

Flowchart 701 begins with arranging one or more phantom cells (element 703). Optionally, the arrangement of phantom cells may also be globally routed but not top level routed. In other words, the general location or general paths of the routing interconnects between the large integrated circuit cell structures may be selected without actually making the top level assignments.

After the phantom cells have been arranged, a design engineer or DFM software program may then determine the in-situ, or in place, properties of the cells (element 704). Examples of what properties may be beneficial to examine at this early stage in the design process may be phantom cell orientation, phantom cell location, and general phantom cell congestion. Alternatively, the DFM software or a designer may also evaluate the design for instances where dummy fill may be placed in vulnerable locations which might otherwise be subject to manufacturability problems.

Upon determining the initial tin-situ properties of the phantom cells, the DFM software or designer may then designate which initial DFM modifications are to be made (element 706). A potential benefit of designating DFM modifications before the detailed routing is that the in-situ properties will not be based on where the targets in the phantom cell are contacted to the top level wiring.

After determining which initial DFM improvements will be made, a DFM algorithm or hardware may then update each phantom cell instance by modifying the overlay template (element 708). Once the DFM algorithm or hardware incorporates all of the designated initial DFM improvements onto the individual phantom cell instances, the preliminary design may be analyzed for performance timing (element 710). Provided that the timing is acceptable, the DFM algorithm may then proceed with the detailed routing, generating the net list, and analyzing the phantom cells for post detailed routing DFM improvement opportunities (elements 720 through 725). The design flow may then follow the same procedures as outlined in FIG. 7A (elements 730 through 745).

Figure 7C:
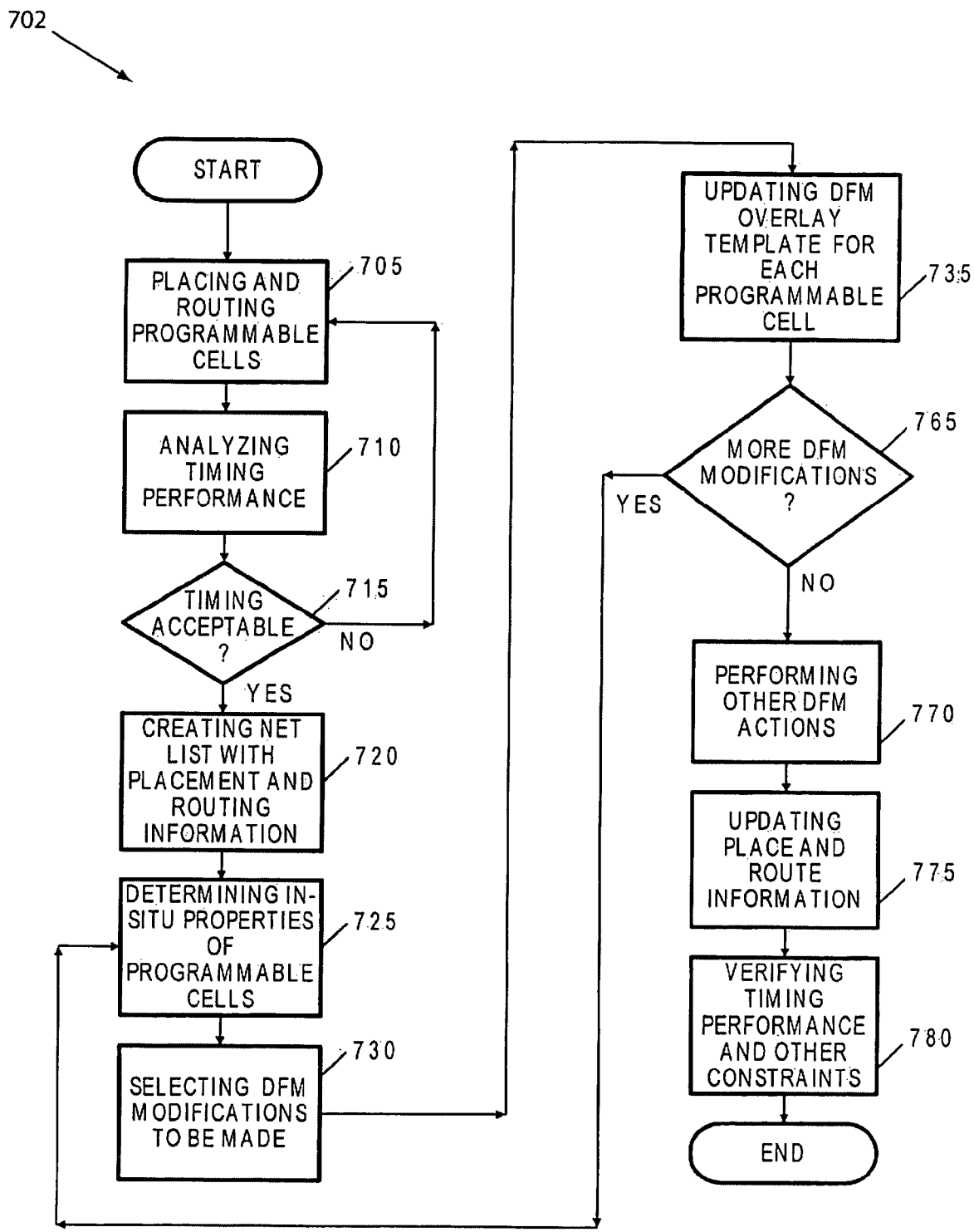

FIG. 7C shows a flowchart for another embodiment of the invention wherein multiple DFM improvements are made to an integrated circuit in a iterative fashion. In other words, after one set of DFM improvements is implemented, a second set of improvements may then be implemented. This iterative process may be followed by successive rounds of DFM improvements until all desired modifications have been implemented.

Similar to the previous embodiment depicted in FIG. 7A, the design process may begin by placing and routing a number of programmable cells and ensuring that the timing is adequate (elements 705 through 715). A new DFM software, algorithm may then create a detailed net list containing the programmable cell placement and routing information (element 720). Using the detailed net list, hardware or a computer program may then analyze the in-situ arrangement of programmable cells for DFM improvement opportunities (element 725). Depending on the arrangement, the hardware or computer program may then select one: set of DFM improvements (element 730) and update the applicable or affected programmable cell parameters accordingly (element 735).

In analyzing and modifying the programmable cells, a single set of DFM improvements may comprise a single modification, such as removing unnecessary routing target elements. Alternatively, this first pass set of improvements may comprise two or more DFM improvements, e.g. spreading interconnection wires after removing unnecessary routing elements. The process of selecting which modifications will be made may be automatic, as in the case of an automated DFM routine, or it may be manual by a designer selecting specific DFM modifications from a computer program menu.

After completing one set of DFM modifications, an algorithm may incorporate another set of different DFM modifications (element 765). In such a case, the algorithm may then re-analyze the in-situ arrangement of programmable cells for instances where the different set of DFM modifications may be implemented (elements 725 and 730), and update the affected programmable cells accordingly (element 735). This cyclical process, of implementing one set of DFM modifications followed by a second set of DFM modifications, may continue until all types of DFM improvements have been implemented.

The cyclical process of implementing DFM modifications may be prioritized, which may be necessary when the desired modifications are mutually exclusive. For example, after the integrated circuit design is placed, routed, and timed, a DFM analyzing routine may step through the net list and determine that the preliminary integrated circuit design has numerous opportunities for one particular type of DFM modification, such as eliminating unused metal layer 1 input contacts. A DFM modification algorithm may then alter the affected programmable cell parameters or implement a complimentary DFM modification, such as adding redundant vias to the top level metal. Another DFM analyzing routine may then analyze for a different type of DFM enhancement, such as adding additional metal layer 1 borders around input contacts. Another DFM enhancement algorithm may then alter the affected programmable cell parameters. As stated before, this cyclical process may continue until all desired DFM modifications are implemented.

Worth pointing out is the potential for numerous DFM opportunities that still may be implemented after routing and implementing other DFM modifications. For example, eliminating and reducing obstructions during one pass of programmable cell alterations may pave the way for straightening wires, creating shorter routes, or reducing global coupling by moving wires into previously occupied locations. These additional DFM actions may comprise one stage in the DFM improvement process (element 770). Once these additional DFM actions are complete, the computer program may then update the placement and routing information (element 775) and verify that the timing and other integrated circuit performance constraints are satisfied (element 780).

Another embodiment of the invention is implemented as a program product for use with a system to implement DFM improvements inn manufacturing integrated circuits in accordance with, e.g., flowchart 700 as shown in FIG. 7A. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

One skilled in the art of integrated circuit design will readily appreciate the flexibility and opportunities that using a programmable cell, or similar methodology, to make DFM improvements affords the field of integrated circuit fabrication. These examples are only a few of the potential cases wherein the use of post-placement-and-routing DFM algorithms, or machines and media that accomplish essentially the same, greatly enhance integrated circuit design-for-manufacturability and reliability.

It will be apparent to those skilled in the art having the benefit of this disclosure that the present invention contemplates methods, systems, and media to improve the manufacturability of cells and structures within cells formed in a semiconductor substrates of an integrated circuit. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions, and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for improving manufacturability of an integrated circuit on a semiconductor substrate using an unmodified plurality of cells, the system comprising:
an arrangement module to arrange the unmodified plurality of cells;
a router to define routes of interconnecting conductive paths between the unmodified plurality of cells based on operation of the integrated circuit;
an evaluation module to evaluate the arrangement of the unmodified plurality of cells and the routes of the interconnecting conductive paths between the unmodified plurality of cells for a manufacturing improvement opportunity; and
a modification module to modify an element of at least one of the unmodified plurality of cells based on the manufacturing improvement opportunity to create a modified plurality of cells, wherein the modified plurality of cells are to be used to create the integrated circuit on the semiconductor substrate, wherein further the modification module is adapted to increase metal surface area on one or more metal layers to provide improved via contact with one or more of the modified plurality of cells.

2. The system of claim 1, wherein the modification module is adapted to remove unused input and output connections from at least one of the unmodified plurality of cells that have multiple input and output connections for use with automated routing tools.

3. The system of claim 1, wherein the modification module is adapted to reroute one or more conductive paths internal to at least one of the unmodified plurality of cells to increase the separation between the one or more conductive paths and adjacent conductive paths.

4. The system of claim 1, wherein the evaluation module is adapted to evaluate logic timing of the unmodified plurality of cells.

5. The system of claim 1, wherein the evaluation module is adapted to reevaluate the arrangement of the unmodified plurality of cells and the routes of the interconnecting conductive paths between the unmodified plurality of cells for a different manufacturing opportunity.

6. The system of claim 5, wherein the evaluation module is adapted to reevaluate the arrangement based on an analysis of logic timing of the integrated circuit.

7. The system of claim 1, wherein the evaluation module is adapted to evaluate the arrangement and the routes for opportunities to reduce critical area.

8. The system of claim 1, wherein the evaluation module is adapted to evaluate the arrangement and the routes for opportunities to remove an unused connection from at least one of the unmodified plurality of cells that has multiple connections for use with an automated routing tool.

9. The system of claim 1, wherein the evaluation module is adapted to evaluate the arrangement and the routes for opportunities to reroute one or more conductive paths internal to at least one of the unmodified plurality of cells to increase the separation between the one or more conductive paths and an adjacent conductive path.

10. The system of claim 1, wherein the evaluation module is adapted to evaluate a hierarchical cell of the unmodified plurality of cells, wherein further the hierarchical cell comprises a base cell and a modifiable cell, the base cell comprising non-configurable elements and the modifiable cell comprising configurable elements.

11. A machine-accessible medium comprising a storage media, wherein the storage media contains instructions, which when executed by a machine, cause the machine to perform operations for improving manufacturability of an integrated circuit on a semiconductor substrate using an unmodified plurality of cells, comprising:
arranging the unmodified plurality of cells;
defining routes of interconnecting conductive paths between the unmodified plurality of cells based on operation of the integrated circuit;
evaluating the arrangement of the unmodified plurality of cells and the routes of the interconnecting conductive paths between the unmodified plurality of cells for a manufacturing improvement opportunity; and
modifying at least one of the unmodified plurality of cells based on the manufacturing improvement opportunity to create a modified plurality of cells, wherein the modified plurality of cells are to be used to create the integrated circuit on the semiconductor substrate, wherein further modifying at least one of the unmodified plurality of cells comprises increasing metal surface area on one or more metal layers to provide improved via contact with one or more of the modified plurality of cells.

12. The machine-accessible medium of claim 11, further comprising generating a netlist to provide connectivity information of the unmodified plurality of cells.

13. The machine-accessible medium of claim 11, further comprising evaluating logic timing of the unmodified plurality of cells to ensure proper integrated circuit operation.

14. The machine-accessible medium of claim 11, further comprising reevaluating the arrangement of the unmodified plurality of cells and the routes of the interconnecting conductive paths between the unmodified plurality of cells for a different manufacturing improvement opportunity.

15. The machine-accessible medium of claim 14, wherein reevaluating the arrangement of the unmodified plurality of cells and the routes of the interconnecting conductive paths between the unmodified plurality of cells occurs after evaluating logic timing of the unmodified plurality of cells.

16. The machine-accessible medium of claim 11, wherein modifying at least one of the unmodified plurality of cells comprises removing unused input and output connections from the unmodified plurality of cells that have multiple input and output connections for use with automated routing tools.

17. The machine-accessible medium of claim 16, further comprising moving at least one of the modified plurality of cells to increase cell density.

18. The machine-accessible medium of claim 11, wherein modifying at least one of the unmodified plurality of cells comprises rerouting one or more conductive paths internal to at least one of the unmodified plurality of cells to increase separation between the one or more conductive paths and an adjacent conductive path.

19. The machine-accessible medium of claim 11, wherein arranging the unmodified plurality of cells comprises arranging a hierarchical cell containing a base cell and a modifiable cell, the base cell comprising non-configurable elements, the modifiable cell comprising configurable elements.

20. The machine-accessible medium of claim 11, wherein arranging the unmodified plurality of cells comprises arranging a hierarchical cell comprising a base cell and a modifiable cell, the base cell comprising configurable and non-configurable elements, the modifiable cell comprising a design-for-manufacturing programmable overlay template.

* * * * *